July 4, 1933.  H. G. TRAVER  1,916,999
AMUSEMENT RIDE AND VEHICLE
Filed July 24, 1929   2 Sheets-Sheet 1
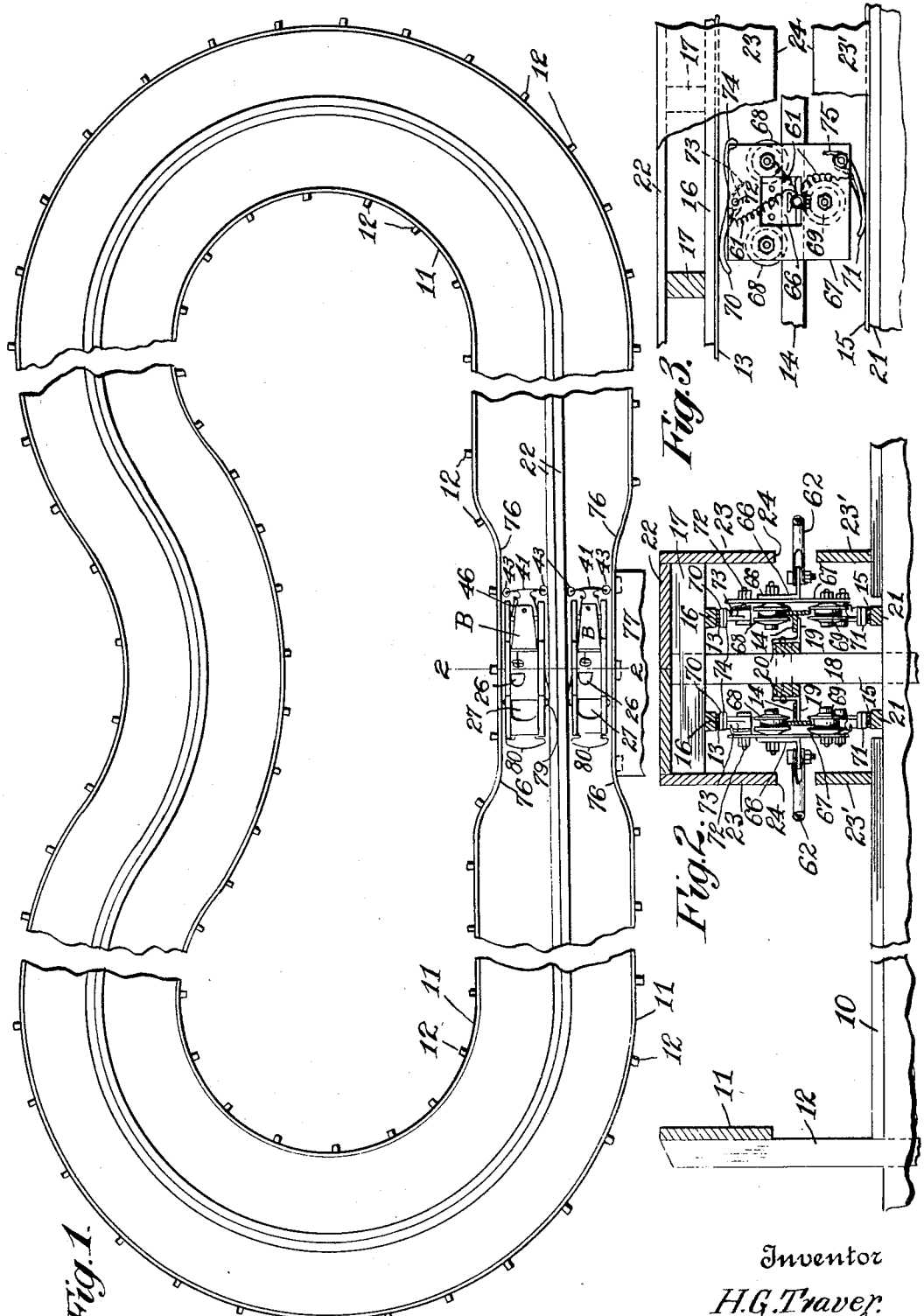

July 4, 1933.  H. G. TRAVER  1,916,999
AMUSEMENT RIDE AND VEHICLE
Filed July 24, 1929  2 Sheets-Sheet 2
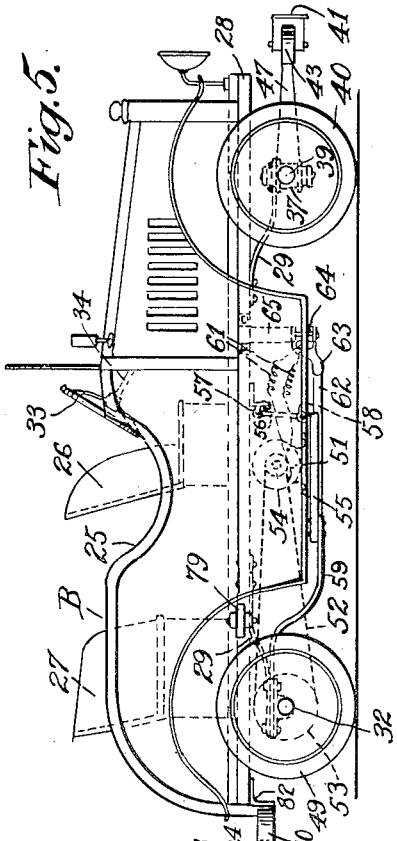
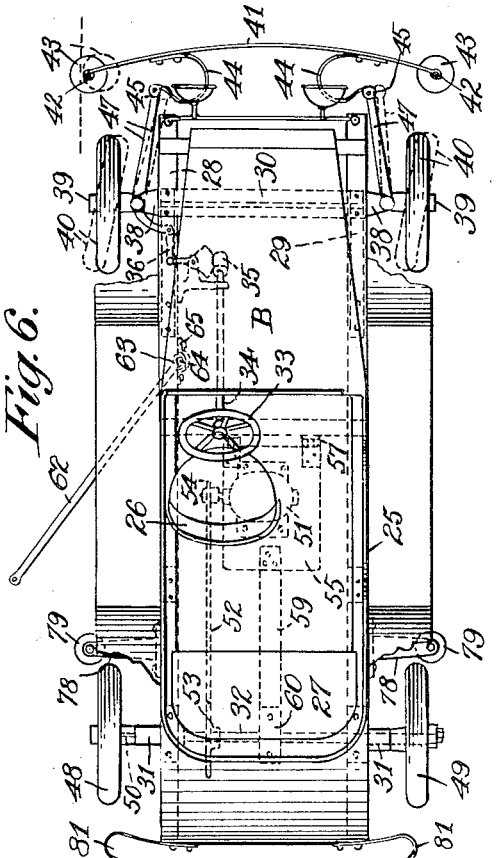
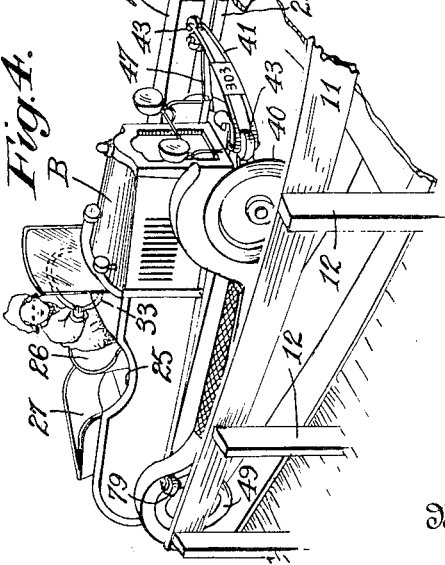
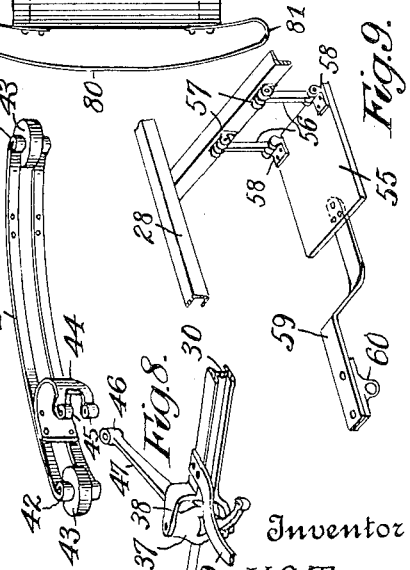
Inventor
H. G. Traver
By his Attorney
John A. Seifert Patented July 4, 1933

1,916,999

UNITED STATES PATENT OFFICE

HARRY G. TRAVER, OF BEAVER FALLS, PENNSYLVANIA

AMUSEMENT RIDE AND VEHICLE

Application filed July 24, 1929. Serial No. 380,568.

This invention relates to an amusement ride and particularly to a continuous track or roadway structure in the form of a course tractionally supporting self-propelled vehicles, simulating automobiles, in abreast relation to each other to give an effect during the travel of the vehicles on the track that a race or several races are in progress, as successive groups of vehicles are operated at the same time.

In the present commercial amusement ride of this type the vehicles are propelled by an electric motor operated on electric current generated by a storage battery, both being carried by the vehicle, with the resultant annoyance and expensive maintenance of the storage battery. To overcome this disadvantage it is an object of the invention to provide the track or course with concealed electric conductor rails connected in circuit with a source of electricity and adapted to be slidably engaged by concealed and protected electric conductor means propelled by the vehicles and electrically connected to an electric motor carried by the vehicles arranged to propel the vehicles along the track or course.

In amusement rides of this type the patrons are mostly children who during the travel of the vehicles, which are steered similarly to the steering of an automobile, lose control of the vehicle due to lack of experience causing the vehicle to collide with safety carriers arranged along the sides of the track the impact of the vehicle therewith swinging the vehicle in a position extending across the track preventing the passage of successive vehicles until the uncontrolled vehicle is straightened to continue the remaining portion of its travel about the track. To overcome this disadvantage in the present commercial amusement ride of this type, it is another object of the invention to provide the steering wheels of the vehicles with means to collide or strike against the barriers in the path of travel of the vehicle and effect a steering of the vehicle away from said barriers preventing the blocking of the track by the vehicle.

It is another object of the invention to arrange the track structure with sections of different widths and locate a loading and unloading station at a narrow section of the track to facilitate the loading and unloading of the vehicles.

It is another object of the invention to provide a novel construction and arrangement of electric conductor rails and tractionally support in relation thereto contacts to slidably engage the rails and flexibly electrically connected to a motor of a vehicle.

It is a further object of the invention to provide a vehicle simulating an automobile having a novel seating arrangement utilizing a minimum amount of space.

It is a still further object of the invention to provide a flexible mounting for the vehicle driving motor and a flexible connection between the motor and driving wheels of the vehicle to compensate for the movement of said wheels and the vehicle frame relative to each other.

In the carrying out of the embodiment of the invention a continuous track structure in the form of a course is provided having dipping, rising and sinuous sections arranged with barriers or abutments along the sides of the track, electric conductor rails connected in circuit with a source of electricity, being arranged intermediate the barriers and covered by an enclosure serving to separate the track into lanes for the passage of vehicles, simulating an automobile, tractionally supported by steering and driving wheels, the vehicles carrying means connected with the steering wheels and adapted to collide with the barriers or conductor rail enclosure should the vehicle be directed out of a straight path of travel on the track to steer the vehicle away from the barriers or rail enclosure, and assure the travel of the vehicle in a substantially straight course about the track, said means comprising a bumper extending transversely in front of the vehicle and beyond the sides of the vehicle carrying rollers to engage the barriers or rail enclosure. The vehicles are propelled along the respective lanes of the track by electric motors mounted in the vehicles to have swinging movement in a vertical direction and flexibly connected to the driving wheels, said motors being electrically connected with the conductor rails by electric conductors extended through a tubular carrier therefor pivotally supported on the vehicle to extend from the side of the vehicle to adjacent the conductor rails with the free end entering through a slot in the sides of the rail enclosure and pivotally connected to an electric contact carrier tractionally mounted on one of the conductor rails connecting the motors in circuit with a source of electricity. The track structure is arranged at a predetermined point with a loading and unloading station and immediately of both ends of station the track barriers converge toward the conductor rail enclosure barrier so that the barriers are spaced apart slightly greater than the width of the vehicles to facilitate the loading and unloading of the vehicles.

In the drawings accompanying and forming a part of this application, Figure 1 is a plan view of the track structure showing vehicles thereon relative to a loading and unloading station.

Figure 2 is a sectional view taken on the line 2—2 of Figure 1 to show the arrangement of the electric conductor rails and trolley contact members for electrically connecting the vehicle propelling motors.

Figure 3 is a view looking at the side of Figure 2 with a portion of the rail enclosure broken away to show the contact members in relation to the conductor rails.

Figure 4 is a perspective view of a vehicle and a portion of the track structure showing the means carried by the vehicle steering wheels colliding with the conductor rail enclosure and effecting adjustment of the steering wheels to direct the vehicle away from said enclosure.

Figure 5 is an elevational view of the vehicle.

Figure 6 is a plan view of the vehicle looking at the top of Figure 5.

Figures 7 and 8 are perspective views showing the colliding means carried by the vehicle and steering wheel adjusting means disassembled; and Figure 9 is a perspective view of a mounting for the vehicle propelling motors.

Similar characters will designate similar parts throughout the specification and drawings.

In carrying out the invention there is provided a continuous or endless course or track structure of any desirable formation having dips, rises and sinuous sections with a flat traction supporting surface comprising planking supported upon suitable struts and tie members, as shown at 10 in Figure 2, and arranged along the sides with barriers in the form of rails 11 fixed to posts 12 vertically mounted on the planking supports. The track is separated into lanes, in the present instance two in number, by superposed electric conductor rails 13, 14 and 15, the number of rails depending on the type of electric current used; a three phase type of current being used in the present instance, with each lane having an independent set of conductor rails connected in different circuits with a source of electricity. Rails 13 are of strap form carried in an overhead manner by strips 16 of insulating material suspended from cross members 17 extending in vertical spaced relation to the track surface, said members 17 being fixed to and extending laterally from the sides of the top of supports 18 mounted on the planking supports. The rails 14 are of T-shape in cross section fixed at the stem of the T to one leg of angle brackets 19 fixed by the other leg thereof on strips 20 of insulating material mounted on the supports 18 intermediate the cross-members 17 and the planking supports with the top of the T of the rail extending in a vertical plane. The rails 15 are of strap form, similar to rails 13, secured upon insulating strips 21 fixed to the top of the tie members of the planking supports, all of the rails and mountings therefor extend parallel to the sides of the track. To conceal and insulate the conductor rails, and also form a central separating barrier for the track, an enclosure is provided comprising a top portion 22 of boards fixed to the cross members 17 and side portions 23, 23′, the portion 23 being fixed to the ends of the members 17 and extending down from the top 22 and the lower portion 23′ being secured upon and extending up from the track planking and arranged to provide opposite to the rails 14 a horizontally extending opening or slot 24 for a purpose to be hereinafter described.

The patrons of the ride are conveyed around the track structure in the respective lanes by vehicles having bodies B simulating automobiles and of a width to permit free movement thereof between the side barriers and conductor rail enclosure and arranged with an opening 25 in the sides thereof leading to a single seat 26 to be occupied by the driver, one of the patrons, and a tonneau in the rear of the seat 26 adapted to have a seat 27 extending the full width of the body adapting the vehicle to have a carrying capacity of three persons, a greater number than have hereunto been accommodated by vehicles of similar rides. The body is yieldingly supported through a frame member 28 of the usual automobile construction by leaf springs 29 fixed at one end intermediate the ends and center of the frame with the opposite ends of the springs that are fixed to the front portion of the frame fixed to an axle 30 of I shape in cross section, and the opposite ends of the springs that are fixed to the rear portion of the frame fixed to sleeve brackets 31 loosely mounted on a rotatable axle 32 and constituting the driving axle.

The vehicles are steered from the seat 26 by a hand wheel 33 carried by a rotatable shaft or post 34 operatively connected by the usual worm and gear segment mechanism, as at 35, and link connections 36 to knuckle members 37 mounted to rotate on vertical axes in bifurcations 38 at the ends of the axle 30, said knuckle members being arranged intermediate the ends with a laterally extending bearing projection 39 for rotatably mounting traction supporting and steering wheels 40, for the vehicles. To maintain the continuous travel of the vehicles on the track and overcome the disadvantage in a ride of this character of having the vehicles colliding with one another and interfering with the continuous operation thereof through the inexperience of the person steering, the vehicles are provided with means to effect automatic steering thereof, comprising a bumper 41 to extend transversely of the vehicle, said bumper embodying parallelly connected resilient bars, two in number in the present instance, of convex formation with the ends arranged with eyes 42 for the engagement of pins to rotatably carry rollers 43 between the bars with the peripheries of the rollers extending beyond the sides and ends of the bars to engage either the barriers 11 or the sides of the enclosure 23. The bumper is supported and operatively connected with the wheels 40 by brackets 44 of yielding material and semi-circular shape fixed at one end to the bumper bars equidistantly from the ends of the bars and the opposite ends bifurcated and the ends of the legs of the bifurcation arranged with eyes 45, similar to the bumper ends 42 for the engagement of pins for pivotal connection with knuckle end portions 46 of arms 47 extending from the knuckle members 37, at substantially a right angle to the projection 39. The length of the bumper is sufficient to have the peripheries of the rollers extend beyond the sides of the wheels and vehicle body to collide with either the barriers 11 or the sides 23 of the conductor rail enclosure, depending in what direction the vehicle is travelling, the bumper as the rollers collide with a barrier being moved in a direction transversely of the longitudinal axis of the vehicle body and away from the barrier thereby turning the wheels 40 in a direction away from the barrier, as shown in dotted lines in Figure 6, and avoiding a collision between the vehicle and the barrier. To reduce the cost of manufacture the worm and gear segment mechanism 35 is linkedly connected to only one of the wheels 40, the movement of the hand steering wheel 33 being imparted to the other wheel 40 through the arms 47, brackets 44 and the bumper 41. By this arrangement should the steering wheels 40 be adjusted in a direction toward a barrier the roller carrying end of the bumper will be projected to a corresponding increased extent from the side of the vehicle.

The vehicles are propelled by a pair of rear wheels 48, 49, the wheel 48 being fixed to one end of the axle 32, by a key connection 50 and the wheel 49 is loosely mounted on the opposite end of the axle, and the wheels are secured on the axle 32 between nuts threaded on the projecting ends of the axle and sleeves 31 on the axle. The wheel 48 only is driven by an electric motor 51 flexibly connected to the axle 32, to compensate for the vertical movement of the said axle due to the flexible mounting thereof through the springs 29, by a sprocket chain 52 passing around a sprocket wheel 53 fixed to the axle 32 and a sprocket wheel 54 fixed to the motor shaft. The motor is flexibly supported by the vehicle frame 28 to compensate for movement of the vehicle and axle 32 relative to each other by a platform 55 suspended between a cross-bar of the frame 28 and the axle 32 by a pair of links 56 pivotally connected at the ends to brackets 57 fixed to the cross-bar of the frame 28 and brackets 58 fixed to the platform, and the rear end of the platform being suspended by a bar 59 at one end fixed to the platform and at the other end to a bearing member 60 to loosely encircle the axle 32. The bar 59 is offset intermediate the ends to have the ends extend in different planes to compensate for the difference in the levels of the motor and axle.

The motor is connected in circuit with a source of electricity through the conductor rails 13, 14 and 15, through insulated conductor wires 61 having terminals connected to the motor terminals and carried in a tubular member 62 arranged at one end with a yoke piece 63 pivotally connected by a pivot pin 64 to a bracket 65 fixed to a side sill of the frame 28 to permit the tubular member to have swinging movement on a horizontal plane. The other end of the member 62 extends beyond the side of the vehicle nearest the conductor rails 13, 14 and 15, the said end entering the slot 24 in the enclosure sides 23, 23' and is pivotally connected to an angle member 66 mounted centrally on a contact carrier comprising a plate 67 of insulating material tractionally supported on the conductor rail 14 by a pair of grooved wheels 68 rotatably mounted in alined horizontal relation on the upper part of the plate to engage the upper edge of the T of rail 14 and a similar grooved wheel 69 is rotatably carried by the plate immediately below the lower edge of the T of rail 14 to prevent the plate from leaving the rail. The wheels 68, 69 may be of electric conducting material but this is not essential as only one wheel is, in the present arrangement, connected to one of the conductors 61, as shown in Figure 3 and being for the purpose of grounding the electric current. The motor is electrically connected to the other conductor rails 13 and 15 by contact shoes 70, 71, each shoe being connected to a different conductor terminal of the conductors 61. The shoe 70 is pivotally mounted adjacent the upper edge of the plate 67 by a pin 72 engaging a hub portion of the shoe with a spring 73 coiled about said hub portion and anchored at one end to the body of the shoe, as shown in Figure 2, to yieldingly urge the shoe into engagement with the rail 13, and to further insure such engagement the shoe is arranged with a counterweight portion 74 extending from the hub portion in a direction opposite to the shoe 70. The shoe 71 is mounted adjacent the bottom and one side of the plate 67 similarly to the mounting of the shoe 70 with a spring 75 coiled about the hub portion of the shoe 71 to urge the shoe against the rail 15 but is not arranged with the counterweight portion as contact is maintained by the force of gravity, the rail 15 being below the mounting of the shoe 71.

To prevent the rear portion of the vehicles and the rear wheels 48, 49 from colliding with the barriers 11 and the sides of the rail enclosure 23, 23', and consequent damage to the vehicles, arms 78 are mounted on the sides of the side sills of the body frame 28 to project beyond the sides of the vehicle, the said free ends being bifurcated and the legs of the bifurcation perforated for the rotatable mounting of shafts carrying rollers 79 for the engagement of the barriers 11 or the sides of the rail enclosure 23 thus preventing collision therewith by the vehicle or driving wheels.

To prevent injury to the rear of the vehicle body by the colliding therewith of the front of a following vehicle, the rear body portions are provided with a bumper comprising a single bar 80 of resilient material of curved formation with the ends bent reversely, as shown at 81 in Figure 6, to extend parallelly to the main portion of the bumper and fastened to the rear end of the frame 28 by angle brackets 82, Figure 5.

A station is provided to facilitate the loading and unloading of the cars, and comprising a platform 77 arranged outside the outer barrier 11. Patrons entering and discharged from the vehicle in the inner lane of the track pass over the enclosure 22 for the conductor rails and through the vehicle in the outer lane and in order that the vehicles will be in close proximity to the rail enclosure 22 to prevent patrons falling between the vehicle and said enclosure, the outer and inner barriers immediately at the ends of the platform 77 converge toward the rail enclosure 22, as at 76, and between such converging portions extend parallel to and are spaced from the rail enclosure 22 a distance slightly greater than the width of the vehicles, the vehicles being guided to such space by the adjustment of the steering wheels through the abutting of the bumper rollers 43 with the barriers 11.

Having thus described my invention I claim:

1. In a vehicle arranged with driving and steering wheels, steering knuckles connected with the steering wheels and having a part extended forward of the wheels, a bumper bar, and semi-circular yielding members secured at one end to the bar and pivotally mounted at the opposite ends on the extended knuckle parts, said bar being of a length to extend beyond the sides of the vehicle and operative to adjust the steering wheels by the colliding of said bar with an obstruction in the path of travel of the vehicle to steer the vehicle away from the obstruction.

2. In a vehicle arranged with driving and steering wheels, arms operatively carried by the vehicle steering wheels to normally project forwardly of the vehicle, and a bumper member resiliently mounted on the arms and arranged at the ends with rollers to engage laterally extending obstructions in the path of travel of the vehicle to actuate the steering wheels to direct the vehicle away from the obstruction.

3. In a vehicle of an amusement ride simulating an automobile arranged with driving and steering wheels, steering mechanism to manually control the steering wheels, a flexible bumper member operatively connected to and resiliently supported by the steering mechanism, and rollers carried at the ends of the member adjacent the steering wheels to collide with an obstruction in the path of travel of the vehicle to adjust the steering wheels by the colliding thereof with the obstruction to direct the vehicle away from said obstruction, and motive means supported by the vehicle and operatively connected with the driving wheels.

4. In a vehicle, a frame member arranged with steering and driving wheels, means to adjust the steering wheels to direct the travel of the vehicle, motive means operatively connected with the driving wheels, and means to hingedly suspend the motive means between the vehicle frame and driving wheels to compensate for movement of the frame and driving wheels relative to each other.

5. In a vehicle, a frame member arranged with steering and driving wheels, a bumper member operatively connected with and resiliently carried by the steering wheels in front of said wheels adapted to collide with an obstruction in the path of travel of the vehicle and adjust the steering wheels by engagement with the obstruction to direct the vehicle away from the obstruction, and rollers supported by and projecting laterally from the frame beyond the sides of the driving wheels to engage obstructions and prevent collision of the driving wheels and vehicle with such obstructions.

6. A vehicle as claimed in claim 4, wherein the means to suspend the motive means comprise a platform hingedly connected to the vehicle frame and loosely connected to the axle of the driving wheels to have swinging movement in a direction longitudinally and vertically of the vehicle.

7. A vehicle as claimed in claim 4, wherein the motive means comprise an electric motor fixed to the suspending means and a flexible driving connection between the axle of the driving wheels and the motor.

8. In an amusement ride, a track structure arranged with barriers along both sides to extend parallelly thereof, vehicles simulating automobiles to travel on said track having steering and driving wheels, and means connected with the steering wheels operative to adjust the steering wheels to direct the travel of the vehicles, said means being normally out of engagement with and adapted to engage a barrier to prevent the vehicles colliding therewith and the engagement of said means with a barrier adjusting the steering wheels to direct the vehicles away from the barrier.

9. In an amusement ride, a track structure arranged with barriers along the sides extending parallelly thereof, vehicles simulating automobiles to travel on said track having steering and driving wheels, a bumper member operatively connected with the steering wheels to adjust said wheels to direct the travel of the vehicles and carrying means at the ends to engage the barriers in the travel of the vehicles in a direction toward the barriers and engagement thereof with a barrier effecting adjustment of the steering wheels to direct the travel of the vehicles away from said barrier.

10. In an amusement ride, a track structure arranged with electric conductor rails connected in circuit with a source of electricity, and extending midway of the sides of the track, a vehicle to travel on the track at opposite sides of the conductor rails, a motor carried by the vehicle, electric conductors connected with the motor, a tubular carrier for and insulated from the conductors pivotally mounted on the vehicle and extending laterally of and below the vehicle, and a carrier of insulating material carrying contacts to engage the conductor rails and connected with the conductors connected with the motor to connect the motor in circuit with the conductor rails and source of electricity and said contact carrier pivotally connected with the tubular conductor carrier.

11. An amusement ride as claimed in claim 10, wherein the contact carrier is tractionally supported on a conductor rail, and the contacts comprise shoes pivotally mounted on the carrier on opposite sides of the supporting portion thereof to slidably engage the conductor rails.

12. In an amusement ride, a continuous track, electric conductor rails arranged midway of the sides of the track and extending for the entire length of the track, barriers extending along the outer sides of the track, an enclosure for said rails separating the track into lanes and serving as barriers along one side of the lanes and having continuous passageways in the side walls thereof, vehicles simulating automobiles to be propelled on the track, an electric motor carried by each vehicle and adapted to propel the vehicles on the track, electric conductors connected to the motor, a carrier for said conductors pivotally mounted on the vehicles to extend from a side thereof with the free end extending through the passageways of the closures for the conductor rails, and contacts electrically connected with the conductors and pivotally connected to the end of the carrier for said conductors within the conductor rail enclosure to slidably engage the conductor rails to connect the motor in circuit with said rails and source of electricity.

13. An amusement ride as claimed in claim 12, wherein one of the conductor rails is of T shape, and the contacts comprise shoes mounted on a carrier tractionally supported on the T shaped conductor rail and pivotally connected to the conductor carrier.

14. In an amusement ride, a track structure arranged with sections of different widths and barriers at the sides thereof, a loading and unloading station at a narrow track section, vehicles simulating automobiles to travel on the track and including steering and driving wheels, and means carried by the steering wheels to extend beyond the sides of the wheels and vehicle to engage the track barriers to steer the vehicles along the track.

15. In an amusement ride, a continuous track structure arranged with a barrier midway of the sides of the track and extending the entire length of the track and barriers at the outer side of the track, said outer barriers converging toward the barrier midway of the track at predetermined points in the track forming a restricted section therein, a loading and unloading station arranged at said restricted track section, and vehicles propelled on the track between the barriers.

16. In an amusement ride, a track, electric conductor rails extending longitudinally of and in a plane above the track, an enclosure for said rails having a slot in the side walls parallel with the rails, and said enclosure serving as a barrier for one side of the track, a barrier at the opposite side of the track, electric motor driven vehicles on the track, and means connected to a motor of a vehicle and extended laterally therefrom and through the slot in the conductor rail enclosure and having connection with the conductor rails to connect the motor in circuit with said rails.

17. In an amusement ride, a course arranged with barriers at both sides thereof, a vehicle adapted to travel along said course having means to manually steer the same between the barriers, and means carried at the opposite ends of the vehicle and extended laterally therefrom to engage and direct the vehicle away from the barriers and maintain the vehicle on the course.

18. In an amusement ride, a course arranged with barriers at both sides thereof, electric conductors mounted on one of the barriers and connected in circuit with a source of electricity, a vehicle adapted to travel along said course having means to manually steer the same between the barriers and an electric motor to propel the vehicle along the course, contacts carried by the vehicle electrically connected to the motor and supported by the conductors in electrical contact therewith to transmit electric current to the motor, and means mounted on the vehicle and extended laterally therefrom to engage and direct the vehicle away from the barriers and maintain the vehicle on the course.

19. In an amusement ride, a course arranged with barriers at both sides thereof, electric conductors mounted on one of the barriers and connected in circuit with a source of electricity, a vehicle adapted to travel along said course having means to manually steer the same between the barriers and an electric motor to propel the vehicle along the course, contacts carried by the vehicle electrically connected to the motor and supported by the conductors in electrical contact therewith to transmit electric current to the motor, and bumpers carried by the vehicle connected to the steering means and having the opposite ends extending beyond the sides of the vehicle to engage and direct the vehicle away from the barriers and maintain the vehicle on the course.

20. In an amusement ride, a course arranged with barriers at the opposite sides and an intermediate barrier separating the course into a pair of tracks, conductor rails carried by the intermediate barrier, vehicles to travel on the tracks at opposite sides of the conductor rails, an electric motor carried by each vehicle to propel the same on the tracks, electric conductor means electrically connected to the vehicle motors extended laterally of and below the vehicle and having electric contacts to slidably engage the conductor rails and moved relative thereto with the travel of the vehicles to connect the motors in circuit with the rails and source of electricity, and means carried by the vehicle to engage the barriers and guide the vehicles along the tracks and away from the barriers.

Signed at Beaver Falls in the county of Beaver and State of Pennsylvania this 13th day of July, A. D. 1929.

HARRY G. TRAVER.